United States Patent [19]

Iwata

[11] Patent Number: 5,732,380
[45] Date of Patent: Mar. 24, 1998

[54] SYSTEM FOR CONTROLLING DRIVING TORQUE OF VEHICLE

[75] Inventor: Toru Iwata, Yokohama, Japan

[73] Assignee: Nissan Motor Co., Ltd., Kanagawa, Japan

[21] Appl. No.: 565,611

[22] Filed: Nov. 29, 1995

[30] Foreign Application Priority Data

Dec. 1, 1994 [JP] Japan ................................. 6-298409

[51] Int. Cl.⁶ ............................................. G06G 7/76
[52] U.S. Cl. ..................... 701/85; 701/84; 701/86; 701/90; 180/197; 123/336; 123/337; 303/139; 303/141
[58] Field of Search .................. 364/426.01, 426.017, 364/426.019, 426.025, 426.027, 426.029, 426.031, 426.032, 426.036, 431.07, 431.052, 426.018, 431.055, 426.038; 477/107, 109, 110, 185, 186, 219; 180/197, 170, 175, 176, 284; 123/403, 394, 345, 481, 333, 416, 417, 396, 399, 350, 361, 349; 303/139, 141

[56] References Cited

U.S. PATENT DOCUMENTS

| | | | |
|---|---|---|---|
| 4,951,208 | 8/1990 | Etoh | 364/426.045 |
| 4,969,102 | 11/1990 | Tamura et al. | 364/426.031 |
| 5,022,483 | 6/1991 | Tsuyama et al. | 180/197 |
| 5,137,105 | 8/1992 | Suzuki et al. | 364/426.032 |
| 5,183,128 | 2/1993 | Ito et al. | 180/197 |
| 5,400,865 | 3/1995 | Togai et al. | 364/426.041 |
| 5,403,247 | 4/1995 | Yagi | 477/107 |
| 5,459,661 | 10/1995 | Yagi et al. | 364/426.031 |
| 5,559,703 | 9/1996 | Iwata et al. | 364/426.032 |
| 5,566,776 | 10/1996 | Iwata | 364/426.027 |
| 5,575,255 | 11/1996 | Abe et al. | 364/426.031 |

*Primary Examiner*—Jacques Louis-Jacques
*Attorney, Agent, or Firm*—Lowe, Price, LeBlanc & Becker

[57] ABSTRACT

In order to provide an accurate traction control by closing a second throttle valve provided in series to an accelerator-operated ordinary throttle valve, with a simplified actuator, a control system for reducing a vehicle driving torque employs one or more sensors for sensing a second vehicle operating parameter representing a road surface friction coefficient ($\mu$) or a driver's command for acceleration, in addition to sensors for sensing a first vehicle operating parameter representing a drive wheel slip. When the road surface friction coefficient is high or when the driver depresses the accelerator pedal hard, the control system restrains the closing operation of the second throttle valve in accordance with the second parameter even though the closure of the second throttle valve is requested by the first parameter.

23 Claims, 9 Drawing Sheets

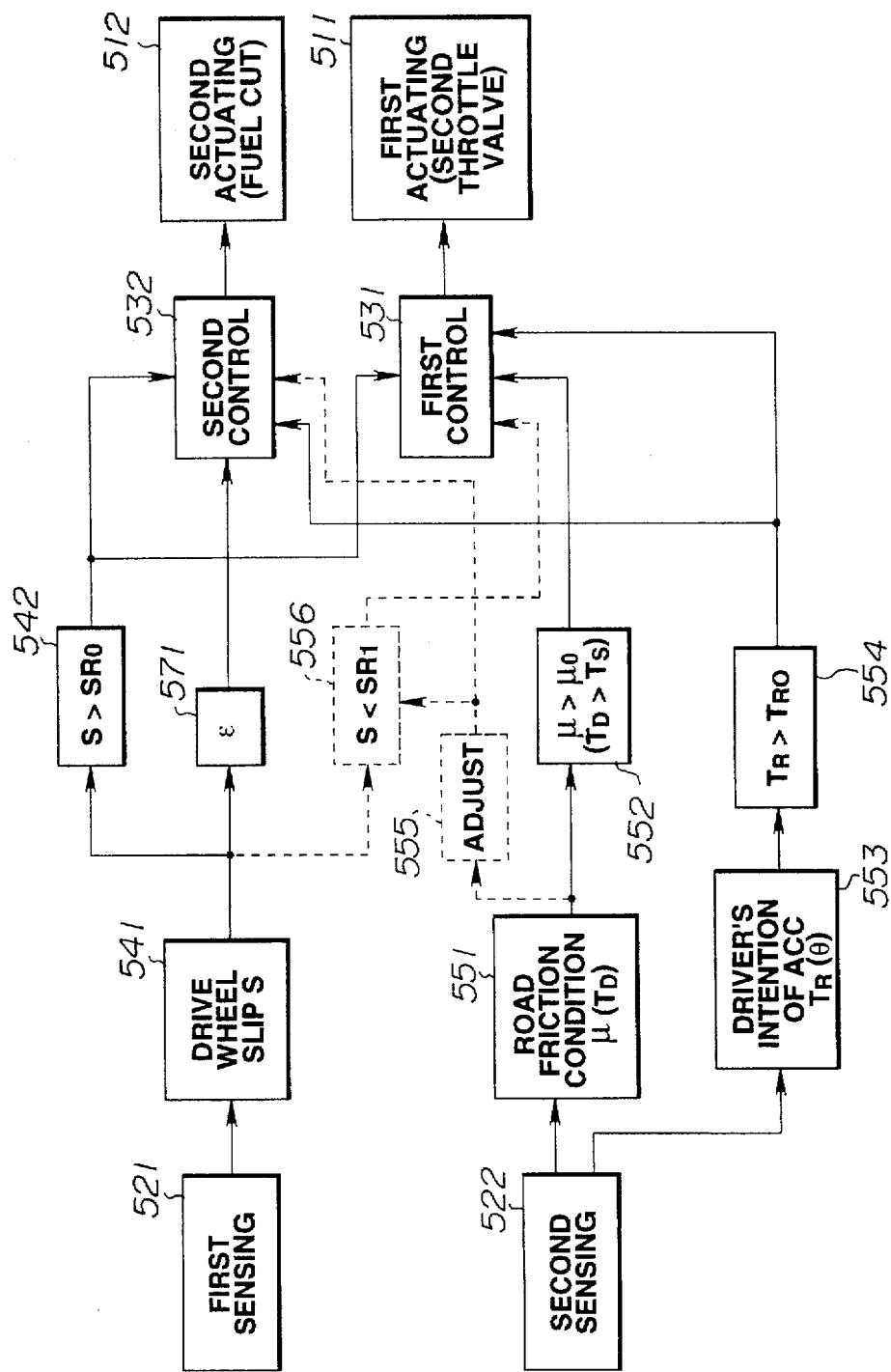

SYSTEM FOR CONTROLLING DRIVING TORQUE OF VEHICLE

BACKGROUND OF THE INVENTION

The present invention relates to a vehicle driving torque control system or traction control system, and more specifically to a control system arranged to restrain a drive wheel slip by closing a second throttle valve provided in series to an ordinary accelerator-operated throttle valve in an intake passage of an engine.

On a slippery road such as a wet asphalt road or a snow-clad road, the drive wheels tend to slip during acceleration, and this drive wheel slippage degrades the accelerating performance of the vehicle and the stability of the vehicle more or less.

Therefore, there has been proposed a driving torque control system intended to improve the starting and accelerating ability of the vehicle and to improve the stability of the vehicle by preventing a rear end swing of the vehicle, by using a second throttle valve disposed in the intake passage of the engine, in series to an ordinary throttle valve connected with the accelerator pedal. In this conventional system, a DC motor (stepper motor) is used to actuate the second throttle valve. When the system detects a slip by monitoring a rotational speed difference between a drive wheel speed and a non-drive wheel speed or some other vehicle operating condition, then the second throttle valve is closed to decrease the driving force (engine torque).

The DC motor can control the opening degree of the second throttle valve precisely. However, the DC motor can become a factor increasing the cost specifically when the control system is aimed to improve the starting and acceleration performance only in a low vehicle speed range for a FF vehicle. Moreover, the DC motor with a speed change mechanism is heavy in weight. In general, the DC motor is integral with a throttle chamber, so that the versatility is poor.

SUMMARY OF THE INVENTION

It is an object of the present invention to provide a vehicle driving torque control system which enables employment of a low-cost, two-step control arrangement for controlling the second throttle valve between a fully open position and a predetermined closed position, and yet provides control performance suitable to the changing vehicle operating situation.

Preferably, the control system according to the present invention employs a simplified actuator of a two-step (or on-off) control type for controlling the second throttle valve alternatively between the open and closed positions, rather than the DC motor of the conventional elaborate system.

In this case, if the opening degree of the second throttle valve in the closed position is set too low, the control system reduces the vehicle driving force excessively in response to a slip on a road surface having a relatively high friction coefficient, so that, after escape from the slip condition, the driver cannot accelerate the vehicle responsively. If, on the other hand, the opening degree in the closed position is set too high, the control system cannot reduce the driving torque sufficiently on a snowy road, in particular a road covered with pressed and hardened snow or icy road (as shown in FIG. 12).

Therefore, in the simple on-off control system alternating between the fully opened position and the closed position, it is difficult to ensure the adequate performance for various road surface conditions of different friction coefficients.

Moreover, when the driver's demand for accelerating the vehicle is strong to escape from a stuck condition, for instance, the closure of the second throttle valve results in an unwanted sharp decrease of the engine output torque.

Therefore, a more concrete object of the present invention is to provide a vehicle driving torque control system which can properly fulfill a variety of requirements on various road surface conditions by combining the simple cost-effective on-off control system regulating the second throttle valve, and another driving torque control system.

Another object of the invention is to provide a vehicle driving torque control system which can properly respond to a driver's intention of acceleration.

According to one aspect of the present invention, as shown in FIG. 1, an driving torque control system for a vehicle, comprises: (i) a second throttle valve 104 which is disposed in series to a first throttle valve in an intake passage for an engine; (ii) a slip condition sensing means 100 for sensing a drive wheel slip condition of the vehicle; (iii) a road condition sensing means 101 for sensing a frictional condition of a road surface under the vehicle; (iv) a first vehicle driving torque reducing means 102 for reducing a vehicle driving torque of the vehicle by closing said second throttle valve in accordance with the drive wheel slip condition sensed by said slip condition sensing means 100; (v) a second vehicle driving torque reducing means 103 for reducing the vehicle driving torque in accordance with the drive wheel slip condition in a more responsive manner than said first reducing means 102; and (vi) a torque reduction limiting means 105 for limiting an operation of said first driving torque reducing means 102 in a road surface condition of a high friction coefficient.

When the slip condition sensing means 100 detects an occurrence of drive wheel slip, the first torque reducing means 102 closes the second throttle valve 104 to a predetermined closed position in accordance with the degree of the drive wheel slip, and thereby restrains the slip by reducing the vehicle driving torque.

When, however, the friction coefficient of the road surface on which the vehicle is running is high, the torque reduction limiting means 105 can limit the control operation of the first torque reducing means 102, and leave the second torque reducing means 103 in control operation to restrain the slip. On a road surface having a high friction coefficient ($\mu$), reacceleration after suppression of the slip requires a significant amount of driving force. In other words, on a high $\mu$ road surface where a slip is less likely to occur, the vehicle driving force immediately before an occurrence of slip is at a high level, and accordingly a large engine output is required for restoration to that high level.

If the second throttle valve 104 is closed in such a high $\mu$ road surface condition by the first torque reducing means 102, the engine will be slow to increase its output torque after recovery from slip because of a delay from a reopening operation of the second throttle valve 104 after suppression of slip until an actual increase of the intake air flow rate, and accordingly the accelerating performance will be poor. The limiting means 105 can avoid this problem by acting to hold the second throttle valve 104 open on such a less slippery road surface and to leave the slip control operation to the second torque reducing means 103. The control system shown in FIG. 1 can provide a superior accelerating performance by increasing the driving torque quickly by canceling the slip control operation of the second torque reducing means 103.

The first torque reducing means 102 is inferior in response characteristic or response speed to the second torque reducing means 103. However, the throttling of the intake air flow which the first torque reducing means 102 is designed to perform is the fundamental way to control the engine output torque. Therefore, the first torque reducing means 102 is superior in drivability (or ability of providing normal and stable combustion) and fuel economy to the other torque reducing means. For example, the use of the brake system deteriorates the fuel economy, and the engine output reduction of the fuel cut off control is stepwise, and not smooth. In this point, the first torque reducing means 102 is worthy to employ.

On a slippery road surface of a low μ, on the other hand, the control system can properly reduce the engine torque with the first torque reducing means 102. If the torque reduction by the first torque reducing means 102 is insufficient to restrain the drive wheel slippage, the control system can further reduce the engine output torque with the second torque reducing means 103, and thereby offer a satisfactory performance of traction control.

The first torque reducing means 102 can employ a simple two step actuator (such as item 15 shown in FIG. 4) alternating between two states. In this case, the control system is further advantageous in simplicity in construction, reliability and cost.

The road condition sensing means 101 may be arranged to determine the road surface friction coefficient by sensing a vehicle acceleration. The vehicle driving force enabling the vehicle to run without slippage with respect to the road surface increases as the road surface friction coefficient becomes higher, and there is a proportional relationship between the driving force and the acceleration. Therefore, the road condition sensing means 101 can detect the road surface friction coefficient from the acceleration at the instant of occurrence of a slip. For the same reason, the road condition sensing means 101 can detect the road surface friction coefficient by estimating the driving force of the drive wheels.

The second driving torque reducing means 103 may take the form of a means for reducing the engine output torque stepwise by controlling a fuel cut cylinder number. In this case, the second torque reducing means 103 can determine a desired reduction quantity of a fuel supply quantity in accordance with a slip deviation of a slip quantity sensed by the slip condition sensing means 100 from a desired slip quantity; then determine a desired fuel cut cylinder number in accordance with the reduction quantity; and control the actual fuel cut cylinder number in accordance with the desired fuel cut cylinder number. In this way, the control system can accurately control the reduction of the driving force in accordance with the slip condition.

The torque reduction limiting means 105 may be in the form of a simple arrangement which limits the operation of the first torque reducing means 102 by increasing a slip threshold (such as SR1 shown in FIG. 8) in accordance with the friction condition (such as μ), and prevents the operation of the first torque reducing means 102 when the slip quantity sensed by the slip condition sensing means 100 is greater than the slip threshold.

The torque reduction limiting means 105 may be arranged to limit the operation of the first torque reducing means 102 by increasing the amount of torque reduction achieved by the second torque reducing means 103.

According to another aspect of the present invention, as shown in FIG. 2, a driving torque control system comprises; (i) a second throttle valve 104 which is disposed in series to a first throttle valve in an intake passage for an engine; (ii) a slip condition sensing means 100 for sensing a drive wheel slip condition of the vehicle; (iii) a torque reducing means 102 for reducing a vehicle driving torque of the vehicle by closing said second throttle valve to the closed position in accordance with the slip condition sensed by said slip condition sensing means; (iv) a required engine output sensing means 107 for sensing a required engine output (such as TR shown in FIG. 10); and (v) a torque reduction inhibiting means 109 for inhibiting an operation of said torque reducing means 102 when said required engine output is equal to or greater than a predetermined level.

If the current engine output torque is high, the torque reduction inhibiting means 109 judges the driver's demand for acceleration to be high, and inhibits the operation of the torque reducing means 102 even though the slip condition sensing means 100 detects the slipping condition requiring the torque reduction of the torque reducing means 102. Therefore, this control system enables an accelerating operation with either or both of the drive wheels slipping, and helps escape form a stuck condition.

The required engine output sensing means 107 can readily sense the required engine output representing the driver's demand for acceleration by sensing a manipulated quantity of the accelerator of the vehicle. The required engine output sensing means 107 may be arranged to determine the required engine output in accordance with a fuel supply quantity supplied to the engine.

BRIEF DESCRIPTION OF THE DRAWINGS

FIG. 13 is a block diagram showing, as an example, an arrangement of various means used in the first, second and third embodiments.

DETAILED DESCRIPTION OF THE INVENTION

Figure 3:
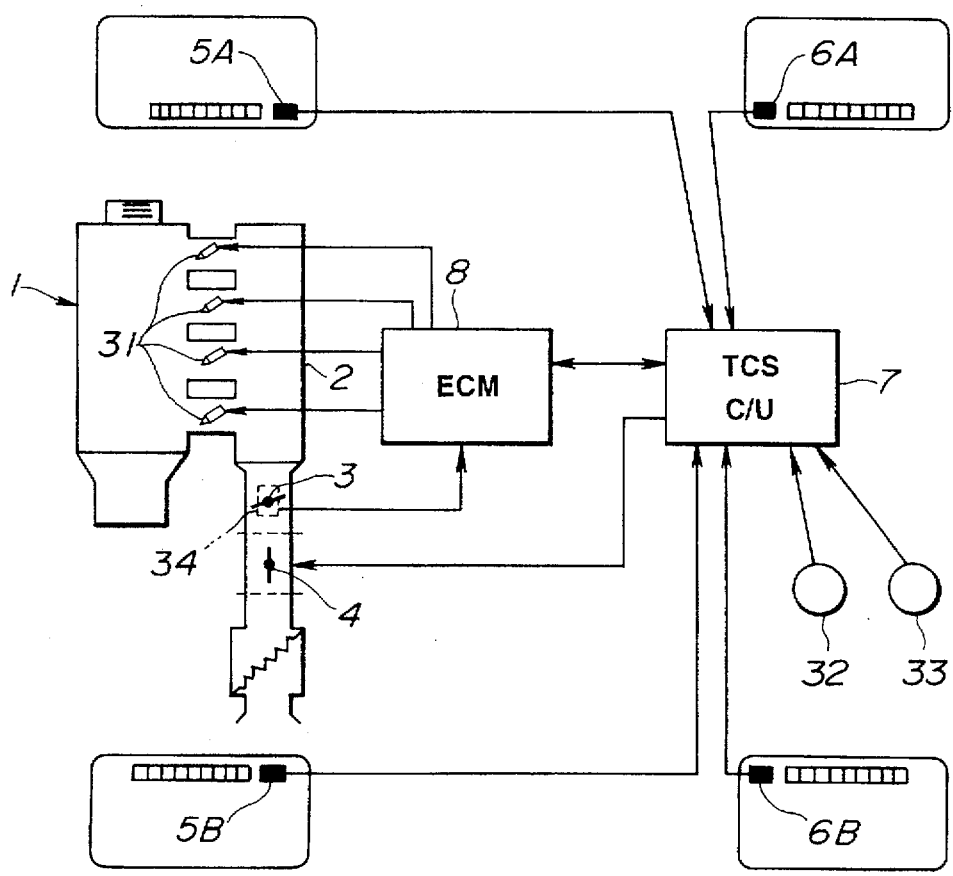
FIG. 3 is a schematic view showing a vehicle equipped with an engine driving torque control system according to the first, second or third embodiment of the present invention.
Figure 4:
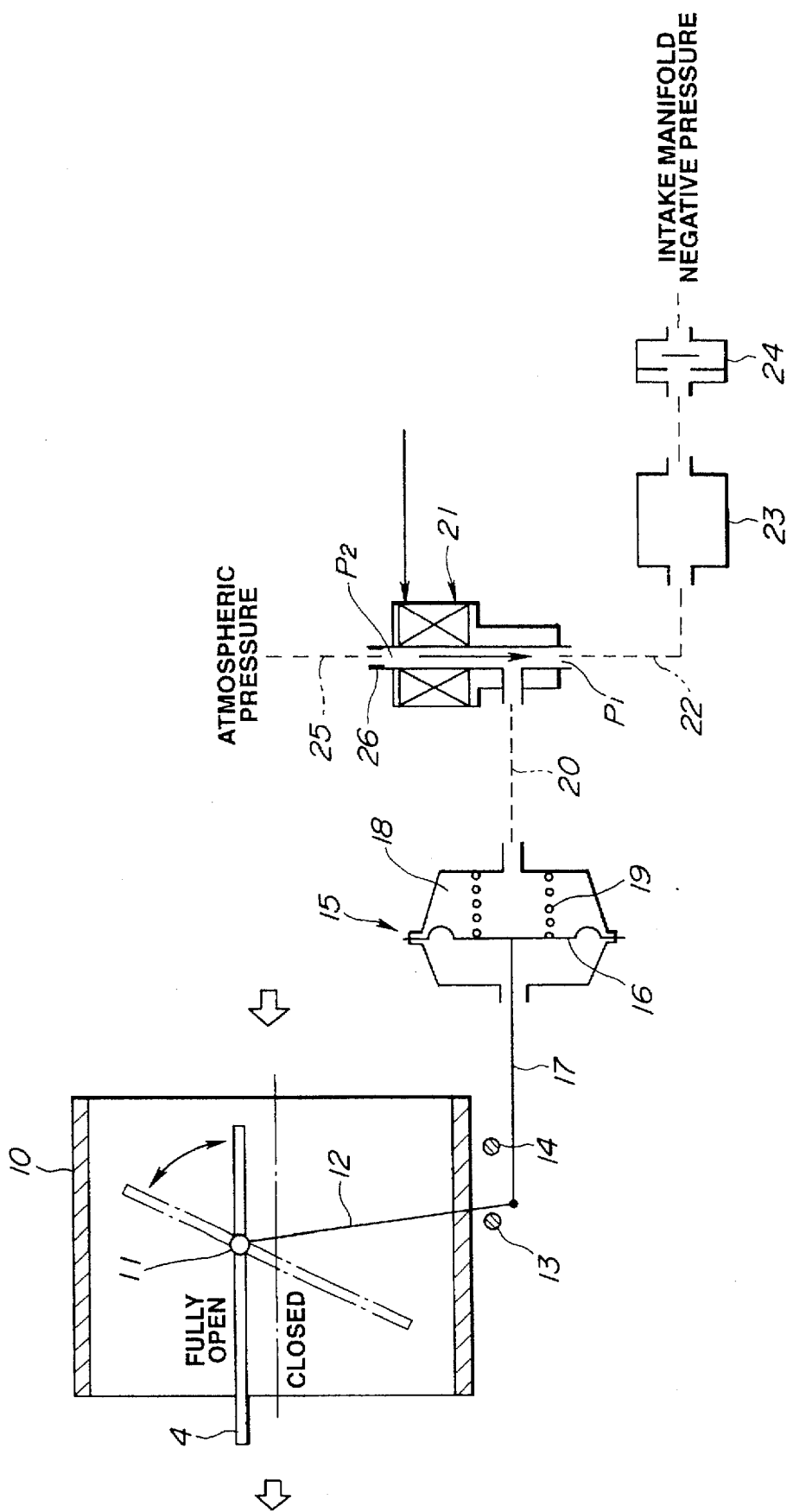
FIG. 4 is a schematic view showing an actuating system for a second throttle valve 4 shown in FIG. 3.

FIGS. 3 and 4 show component parts employed in illustrated embodiments of the present invention.

A first throttle valve 3 is provided in an intake passage 2 of an engine 1. The engine 1 of this example is transversely mounted on an FF vehicle. The first throttle valve 3 is connected with an accelerator pedal so that the opening degree of the first throttle valve 3 is determined by the depression degree of the accelerator pedal.

A second throttle valve 4 is further provided in the intake passage 2 of the engine 1. The second throttle valve 3 of this example is disposed on the upstream side of the first throttle valve 3. The second throttle valve 3 is a normally open valve.

An fuel injector valve 31 is provided for each cylinder of the engine.

Wheel speed sensors 5A and 5B are provided for right and left front wheels (drive wheels) of the vehicle. Wheel sensors 6A and 6B are for right and left rear wheels (non-drive wheels).

A traction control unit 7 receives wheel speed signals from the wheel speed sensors 5A, 5B, 6A and 6B, detects an occurrence of slip in accordance with a wheel speed difference between a drive wheel speed and a non-drive wheel speed, and produces driving force reduction request signals when the slip occurs. A first one of the driving force reduction request signals is sent to an actuating system for actuating the second throttle valve 4 (to a three way solenoid valve 21, to be exact).

An engine control module 8 receives a second one of the driving force reduction request signals from the traction control unit 7, and performs a fuel cut control so that fuel supply is cut off to a predetermined number of engine cylinders determined in accordance with a required reduction of the vehicle driving torque.

A longitudinal acceleration (G) sensor 32 shown in FIG. 3 senses the longitudinal acceleration Xg of the vehicle.

A lateral acceleration (G) sensor 33 senses a lateral acceleration Yg of the vehicle. The traction control unit 7 receives the signals from the longitudinal and lateral G sensors 32 and 33, and estimates a road surface friction coefficient μ.

A throttle sensor 34 senses the opening degree of the first throttle valve 3. The signal representing the throttle opening sensed by the throttle sensor 34 is supplied, as an input signal for engine control, to the engine control module 3, and further sent from the engine control module 8 to the traction control unit 7, as a signal for discriminating a condition to inhibit the closing operation of the second throttle valve 4 as mentioned later.

The actuating system for the second throttle valve 4 is shown in FIG. 4.

A butterfly type valve is employed as the second throttle valve 4 in this example. The butterfly type second throttle valve 4 is disposed in a chamber 10 of resin forming the intake passage 2.

A valve shaft 11 of the second throttle valve 4 is eccentric, and situated to one side with respect to the center line of the chamber 10.

A lever 12 for operating the second throttle valve 4 is fixed to the valve shaft 11. The lever 12 is swingable between stoppers 13 and 14 for limiting the swing movement of the lever 12. With the aid of the stoppers 13 and 14, the second throttle valve 4 can assume a fully open position and a closed position of a predetermined small opening. In the closed position, the opening degree of the second throttle valve 4 of this example is about ⅛.

A negative pressure diaphragm type actuator 15 shown in FIG. 4 includes a diaphragm 16 which is connected with the lever 12 of the second throttle valve 4 by an output rod 17. The diaphragm type actuator 15 further includes a negative pressure working chamber 18 defined by the diaphragm 16, and a spring 19 disposed in the negative pressure chamber 18, for urging the diaphragm 16. When a negative pressure is introduced into the negative pressure chamber 18, the diaphragm 16 moves to the right as viewed in FIG. 4, and brings the second throttle valve 4 to the closed position. Introduction of the atmospheric pressure into the negative pressure chamber 18 causes a leftward displacement of the diaphragm 16, and accordingly, the second throttle valve 4 returns to the fully open position.

A three way solenoid valve 21 is connected with the negative pressure working chamber 18 of the diaphragm type actuator 17 by a communication passage 20, and arranged to selectively introduce the negative pressure or the atmospheric pressure into the negative pressure chamber 18. In an off state, the three way solenoid valve 21 closes a negative pressure inlet port P1 and opens an atmospheric pressure inlet port P2. In an on state, the atmospheric pressure inlet port P2 is closed, and the negative pressure inlet port P1 is opened.

A negative pressure tank (or reservoir) 23 and a check valve 24 are provided in a passage for introducing the negative pressure from the intake manifold to the three way solenoid valve 21. A negative pressure feed passage 22 fluidly connects the negative pressure port P1 of the three way solenoid valve 21 with the negative pressure tank 23. Through the check valve 24, the negative pressure tank 23 is further connected to the intake manifold (to the position downstream of the first throttle valve 3 in the intake passage 2).

An orifice 26 is provided in an atmospheric pressure passage 25 for introducing the atmospheric pressure to the atmospheric pressure port P2 of the three way solenoid valve 21. The orifice 26 serves as an operating time differentiating means.

The use of the thus-constructed negative pressure diaphragm type actuator system for switching the second throttle valve 4 between the fully open state and the predetermined fully closed state in a manner of a two step control can significantly reduce the manufacturing cost as compared with the conventional system using the DC motor. In place of the negative pressure diaphragm type actuator, it is optional to employ a solenoid actuator capable of providing a predetermined stroke. The solenoid actuator is also advantageous in cost as compared with the DC motor.

The driving torque control system constructed as shown in FIGS. 3 and 4 is operated as follows:

In normal operations, the three way solenoid valve 21 is held in the off state. Accordingly, the negative pressure inlet port P1 is closed, and the atmospheric pressure inlet port P2 is open. In this state, the atmospheric pressure is introduced into the negative pressure chamber 18, and the spring 19 holds the second throttle valve 4 in the fully open position by pushing the diaphragm 16 leftward in FIG. 4. The fully open position corresponds to an opening degree which can ensure an amount of air required by the engine.

The traction control unit 7 of this example computes the wheel speed difference between the front wheel speed determined from the signals of the front wheel speed sensors 5A and 5B and the rear wheel speed determined from the signals of the rear wheel speed sensors 6A and 6B. When this wheel speed difference exceeds a predetermined value, the traction control unit 7 judges a slip condition present, produces the engine driving torque reduction request signal, and delivers this reduction request signal to the three way solenoid valve 21

By this engine driving torque reduction request signal, the three way solenoid valve 21 switches from the off state to the on state, and makes the atmospheric pressure port P2 closed and the negative pressure port P1 open. As a result, the negative pressure is introduced into the negative pressure working chamber 18 of the diaphragm unit 15, and causes the diaphragm 16 to move rightward in FIG. 4 against the resilient force of the spring 19. With this rightward displacement of the diaphragm 16, the second throttle valve 4 is brought to the closed position of an approximately ⅛ opening degree.

The opening degree of the second throttle valve 4 in the closed position is set to a predetermined small degree which is required to repress the slip, but which is not so small as to cause an engine stall. The setting to about ⅛ is adequate to repress the slip without causing an engine stall.

Figure 5:
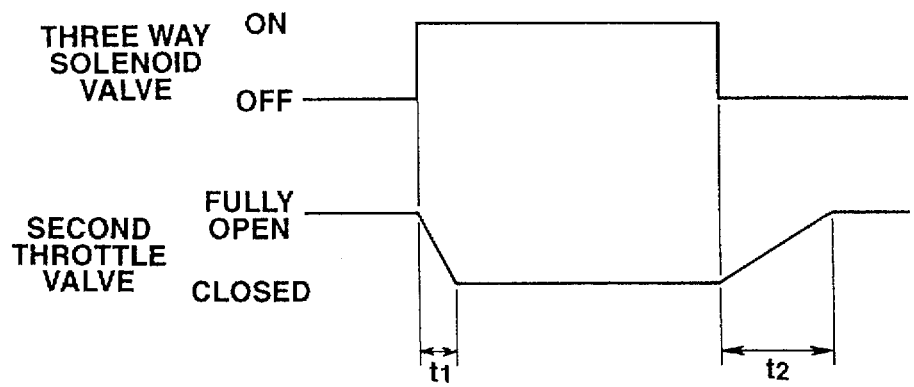
FIG. 5 is a time chart showing operating times of the second throttle valve actuating system of FIG. 4.

A closing time of the second throttle valve 4 is set to a very short time equal to or smaller than 0.2 sec in order to repress the slip quickly on a low μ road. The closing time (t1 in FIG. 5) is a period of time during which the second throttle valve 4 is moving from the fully open position to the closed position. The effective pressure receiving area of the diaphragm 16, the diameter of the negative pressure feed passage 22 and the like are so chosen as to decrease the closing time of the second throttle valve 4.

The closing operation of the second throttle valve 4 decreases the driving force of the engine, and lowers the degree of slip. When the degree of slip is lowered sufficiently, the traction control unit 7 cancels the driving torque reduction request signal.

The three way solenoid valve 21 is thus deprived of the reduction request signal, and returns from the on state to the off state. Therefore, the negative pressure inlet port P1 closes and the atmospheric pressure inlet port P2 opens and introduces the atmospheric pressure into the negative pressure working chamber 18 of the diaphragm unit 15. The diaphragm 16 moves leftward in FIG. 4 by the force of the spring 19 and returns the second throttle valve 4 to the fully open position.

An opening time required for the second throttle valve 4 to move from the closed position to the fully open position (t2 shown in FIG. 5) is set equal to more than ten times as much as the closing time (t1) from the fully open position to the closed position, in order to prevent an undesired feeling of dashing when the road changes from a low μ condition to a high μ condition. In this example, the closing time (t2) is set to 2~7 sec by making a flow passage resistance of the atmospheric pressure passage 25 greater with the orifice 26 than that of the negative pressure feed passage 22.

The diaphragm type actuator 15 is designed to hold the second throttle valve 4 in the fully open position even if the negative pressure disappears for one reason or another. In this case, the pressure in the negative pressure chamber 18 becomes equal to the atmospheric pressure, and the second throttle valve 4 is put in the fully open position. Therefore, this control system allows the vehicle to be operated even in such a case.

With the eccentric or asymmetric arrangement, the second throttle valve 4 remains open even if the second throttle valve 4 becomes loose, freely rotatable or disconnected from the output rod 17, for example. The valve shaft 11 is deviated from the center of the intake passage 2, and the pressure receiving area of the valve element on one side of the valve shaft 11 is greater than that on the other side of the valve shaft 11. Therefore, the pressure difference between the upstream side of the second throttle valve 4 and the downstream side (receiving a negative pressure) produces a moment in the direction to open the second throttle valve 4. This control system allows the vehicle to be operated even in this case.

Figure 6:
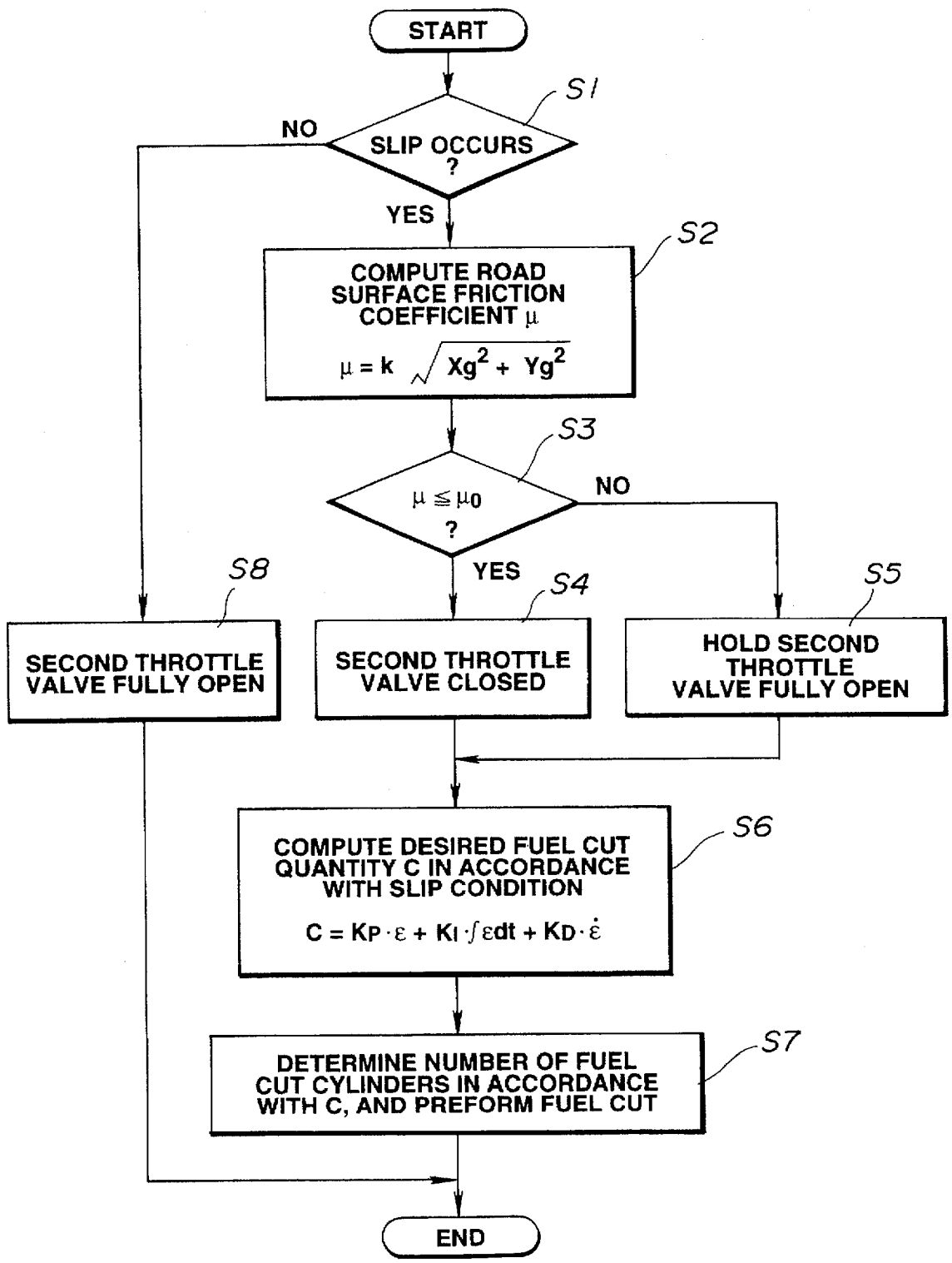
FIG. 6 is a flow chart showing a control procedure performed by a control system according to a first practical example of the first embodiment.

FIG. 6 shows a control procedure performed by a driving torque reduction control (or traction control) system according to a first practical example of a first embodiment of the present invention. This control system combines the above-mentioned first driving force reducing means 102 for reducing the vehicle driving force by controlling the second throttle valve 4 and the second driving force reducing means 103 which, in this example, reduces the vehicle driving force by controlling the number of fuel cut cylinders.

At a step S1 of FIG. 6, the control system determines whether or not a slip exists.

If no slip is detected at the step S1, the control system maintains the fully open state of the second throttle valve 4 at a step S8, and then terminates this routine. If a slip is detected, the control system proceeds to a step S2.

In this example as mentioned before, the control system detects an occurrence of slip by monitoring the wheel speed difference between the front and rear wheel speeds. The control system determines a slip quantity S which is a wheel speed difference resulting from subtraction of the nondrive wheel speed from the drive wheel speed. For example, the drive wheel speed is an arithmetic mean of the left and right drive wheel speeds, and the nondrive wheel speed is an arithmetic mean of the left and right nondrive wheel speeds. In this example, the control system determines, at the step S1, whether the sensed actual slip quantity S in the form of the sensed wheel speed difference is equal to or greater than a predetermined slip quantity SR0. If it is, then the control system judges that a slip condition exists, and proceeds to the step S2. If the sensed slip quantity S is smaller than the predetermined slip quantity SR0, then the control system proceeds from the step S1 to the step S8.

If an occurrence of slip is detected, the control system computes a road surface friction coefficient μ at the step S2. In this example, the control system determines the friction coefficient μ in accordance with the longitudinal acceleration Xg sensed by the longitudinal acceleration sensor (longitudinal G sensor) 32 and the lateral acceleration Yg sensed by the lateral acceleration sensor (lateral G sensor) 33. For instance, a formula for calculating the friction coefficient μ is; $\mu = k \cdot (Xg^2 + Yg^2)^{1/2}$ where k is a constant. In this case, the friction coefficient μ is proportional to the magnitude of the acceleration in the traveling direction of the vehicle. The longitudinal acceleration sensor 32, the lateral acceleration sensor 33 and the means for performing the step S2 serve as the road condition sensing means 101.

It is possible to calculate the longitudinal and lateral accelerations Xg and Yg without using the acceleration sensors 32 and 33. For instance, the longitudinal acceleration Xg can be calculated from the acceleration of the nondrive wheel speed (or the rate of change of the nondrive wheel speed with respect to time, which can be determined by the amount of change of the nondrive wheel speed during a unit time interval). The lateral acceleration Yg can be calculated from the difference between the wheel speeds of the left and right nondrive wheels. That is, $Yg=|VFL-VFR|\cdot(VFL-VFR)/2\cdot\alpha$ where VFL and VFR are the left and right nondrive wheel speeds and $\alpha$ is a constant.

At a step S3, the control system compares the friction coefficient 82 obtained at the step S2 with a predetermined value $\mu0$, and determines whether the friction coefficient $\mu$ is smaller than or equal to the predetermined value $\mu0$. The predetermined friction coefficient value $\mu0$ is set equal to a value (about 0.35) corresponding to the level of a pressed-snow-covered road surface, for instance. Besides, the opening degree (⅛) of the second throttle valve 4 in the predetermined closed position is set approximately equal to an upper limit of the range in which, on a road surface having the predetermined coefficient value $\mu0$, the vehicle can be operated at a restrained degree of slip without losing a grip.

A step S4 is reached if the sensed road surface friction coefficient $\mu$ is judged to be equal to or smaller than the predetermined value $\mu0$. At the step S4, the control system brings the second throttle valve 4 to the predetermined closed position by turning on the three way solenoid valve 21. The actuator for the second throttle valve 4 and the means for performing the step S4 serve as the first driving force reducing means 102.

Thus, this control system can reduce the engine output torque and hence the vehicle driving force to a level enabling the vehicle to travel with a gripping ability on the road surface of the predetermined friction coefficient $\mu0$.

At steps S6 and S7 following the step S4, the control system performs the second driving force reduction control to control the number of the fuel cut cylinders in accordance with the slip condition. The means for performing the steps S6 and S7 serves as the second driving force reeducating means 103.

In this example, the control system determines, at the step S6, a desired fuel cut quantity C from a deviation $\epsilon$ of the sensed slip quantity S from a preset desired slip quantity Stg for enabling an optimum driving, according to a PID control law (or control action). Then, at the step S7, the control system performs the fuel cut control so that the number of the fuel cut cylinder or cylinders corresponds to the desired fuel cut quantity C determined at the step S6. The desired fuel cut quantity C in this example is given by;

$$C = KP \cdot \epsilon + KI \cdot \int \epsilon dt + KD \cdot d\epsilon/dt$$

where KP is a proportional gain of the proportional control action, KI is an integral gain of the integral control action, and KD is a derivative gain of the derivative control action.

When the sensed actual road surface friction coefficient $\mu$ is equal to or smaller than the predetermined value $\mu0$, the amount of slip exceeds the desired slip level, and the control system performs a feedback control for reducing the vehicle driving force by reducing the supply of fuel, and thereby provides the vehicle with an adequate amount of driving force while holding the slip quantity around the desired slip level.

A step S5 is reached if the sensed road surface friction coefficient $\mu$ is judged to be greater than the predetermined value $\mu0$. The control system maintains the fully open state of the second throttle valve 14 at the step S5, and then proceeds to the step S6. The means for performing the step S3 and the step S5 corresponds to the driving force reduction control limiting means 105.

Then, at the step S6 and S7 following the step S5, the control system determines the desired fuel cut quantity C according to the PID control law, and cuts off the supply of fuel to one or more cylinders the number of which corresponds to the desired fuel cut quantity C as described before. In this case, the control system holds the second throttle valve 4 fully open, and controls the vehicle driving force only by the fuel cut control. That is, this control system refrains the driving force reduction control by the second throttle valve 4 because, on a road surface having a friction coefficient $\mu$ higher than the predetermined friction coefficient $\mu0$, the closing of the second throttle valve 4 results in an excessive reduction of the vehicle driving force, so that the driving operation is limited to a low vehicle speed operation with a slip rate lower than the desired level. When the vehicle is relieved of the slip condition, and accelerated again, the accelerating performance of the vehicle is made insufficient by a considerable delay of an increase of the engine output due to a delay from the switching operation of the second throttle valve 4 from the closed position to the fully opening position, to an actual increase of intake air flow rate.

Therefore, the control System of this example prevents the operation of the first torque reducing means 102, and controls the slip only with the second torque reducing means 103 on such a high friction coefficient road surface. The control system can allows a relatively high vehicle speed operation while keeping the slip quantity around the desired level, and at the same time provide a responsive reaccelerating performance after escape from the slip condition by causing the driving torque to be increased quickly by cancellation of the operation of the second torque reducing means 103.

The second driving force reducing means 103 is a means which is superior in response characteristic or speed of response to the first driving force reducing means 102. The second driving force reducing means 103 is in the form of the means for fuel cut control in the example of FIG. 6. As the second driving force reducing means 103, it is possible, however, to employ some other means capable of reducing the vehicle driving force. For instance, the second driving force reducing means 103 may be a controlling means or system for controlling the engine output by controlling an engine operating parameter other than the throttle opening, such as a retard angle of the ignition timing, or a shift controlling means or system for an automatic transmission, or a controlling means or system for increasing a braking force. In the case of the ignition timing control, the combustion becomes worse if the ignition timing is retarded too much. Therefore, it is desirable to use the retard angle control in combination with the fuel cut control, and to reduce the engine power output finely and precisely. In the case of the automatic transmission shift down control or the brake force control, the control system may be arranged to calculate a desired driving force reduction quantity corresponding to the before-mentioned desired fuel cut quantity C, and to carry out a control operation to control the transmission ratio (or gear ratio) or the braking force to a level determined by the calculated desired driving force reduction quantity.

In the example shown in FIG. 6, the control system determines the road surface friction coefficient $\mu$ from the acceleration of the vehicle. However, it is optional to determine the friction coefficient $\mu$ from the driving force of the drive wheels of the vehicle when the slip occurs, as shown in FIG. 7.

Figure 7:
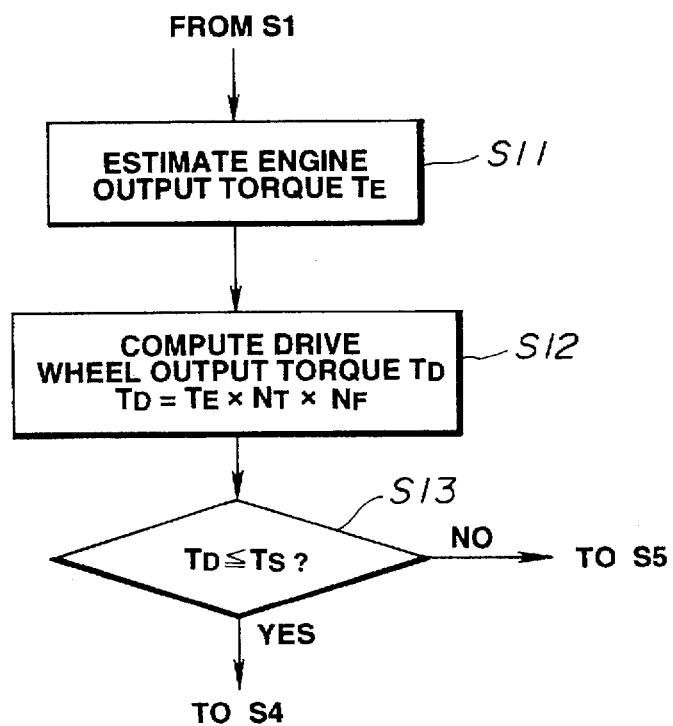
FIG. 7 is a flow chart showing a section of a control procedure according to a second practical example of the first embodiment.

FIG. 7 shows a sequence of steps which can be substituted for the program section of the steps S2 and S3 in the flow chart of FIG. 6.

The control system proceeds to a step S11 of FIG. 7 from the step S1 if the answer of the step S1 of FIG. 6 is affirmative. At the step S11, the control system estimates an engine output torque TE at the time of slip occurrence, from the basic fuel injection quantity TP or the like.

At a step S12, the control system computes a drive wheel output torque TD by multiplying the engine output torque TE determined at the step S11 by a transmission gear ratio NT of the transmission, and a final gear ratio NF of the final reduction gear. That is, TD=TE×NT×NF.

At a step S13, the control system compares the drive wheel output torque TD with a predetermined value TS. If TD is equal to or smaller than TS (TD≦TS), the control system proceeds from the step S13 to the step S4 shown in FIG. 6. By following the course of the steps S1→S11→S12→S13→S4→S6→S7, the control system closes the second throttle valve 4 and performs the fuel cut control. If TD is greater than TS (TD>TS), the control system takes the course of the steps S1→S11→S12→S13→S5 →S6→S7, and performs only the fuel cut control by keeping the second throttle valve 4 in the fully open state.

The predetermined drive wheel output torque value TS is set equal to a value corresponding to the magnitude of the drive wheel output torque enabling a vehicle operation at a restrained degree of slip without losing a grip. Therefore, a driving force control provided by the steps S11~S13 is substantially identical to the control depending on the comparison in the steps S2 and S3 between the friction coefficient μ and the predetermined value μ0.

Figure 8:
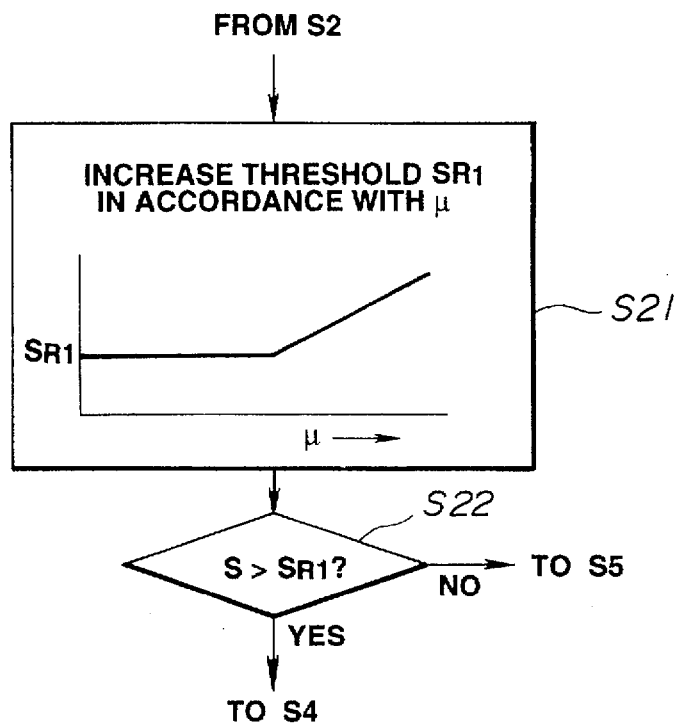
FIG. 8 is a flow chart showing a section of a control procedure according to a first practical example of the second embodiment.

FIG. 8 shows a first practical example of a second embodiment of the present invention. A sequence of steps shown in FIG. 8 can be substituted for the step S3 in the control procedure of FIG. 6. In the example of FIG. 8, the decision step S3 to select one of the alternative steps S4 and S5 is replaced by a step S22 in which the slip quantity S is compared with a predetermined slip threshold value SR1, and this threshold value SR1 is varied at a step S21 in accordance with the friction coefficient μ determined in the step S2 to limit the operation of the first driving force reducing means 102.

After the determination of the friction coefficient μ at the step S2 in FIG. 6, the control system proceeds to the step S21, and determines, at the step S21, the threshold SR1 in dependence on the friction coefficient μ. As shown in a graph in FIG. 8, the control system increases the threshold SR1 as the friction coefficient μ increases. In this example, the threshold SR1 is a monotone increasing function (monotone nondecreasing function) of μ. More specifically, in this example, SR1 is fixed at a predetermined value when μ is smaller than a predetermined value and SR1 is increased linearly with μ when the μ is greater than the predetermined value.

At the step S22, the control system compares the sensed slip quantity S with the threshold SR1 determined at the step S21. If S is greater than SR1 (S>SR1), the control system proceeds from the step S22 to the step S4 of FIG. 6, and performs the closing operation of the second throttle valve 4 at the step S4, and the fuel cutting operation of the steps S6 and S7. If the sensed slip quantity S is equal to or smaller than SR1 (S≦SR1), then the control system proceeds from the step S22 to the step S5 of FIG. 6, and performs the operation to hold the second throttle valve 4 fully open at the step S5 and the fuel cutting operation at the steps S6 and S7.

In this way, the control system limits the closing operation of the second throttle valve 4 when the friction coefficient μ is high, by decreasing the likelihood of selection of the step S4 in accordance with the friction coefficient μ. When the closing of the second throttle valve 4 is prevented at the step S5, the control system performs the driving force reduction control by the fuel cut control or some other form of the second driving force reducing means 103.

In the example of FIG. 8, the threshold SR1 is equal to or greater than SR0 used in the step S1.

Figure 9:
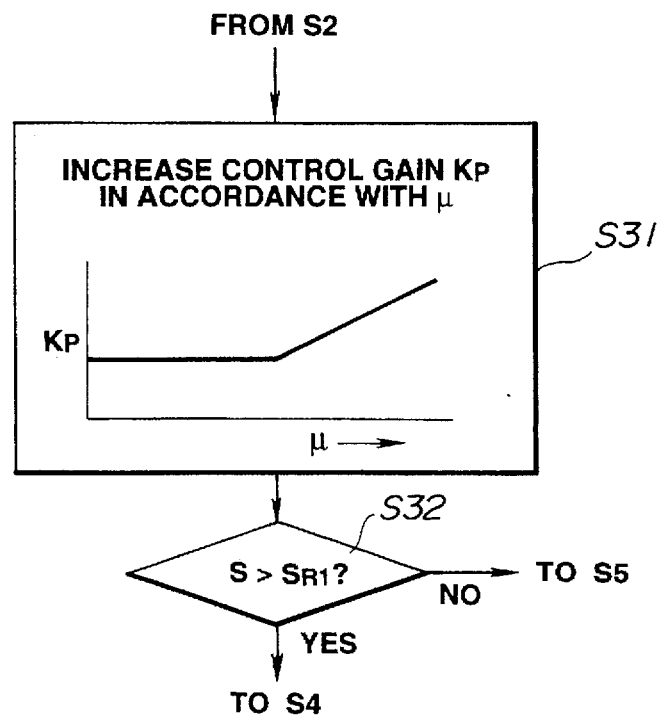
FIG. 9 is a flow chart showing a section of a control procedure according to a second practical example of the second embodiment.

FIG. 9 shows a second practical example according to the second embodiment. A sequence of steps shown in FIG. 9 can be substituted for the step S3 in the control procedure of FIG. 6. In the example of FIG. 9, the control system is arranged to limit the operation of the first driving force reduction control by varying the degree of the operation of the second driving force reduction control. More specifically, the control system increases the control gain, such as KP, of the second driving force reduction control such as the fuel cut control, as the friction coefficient μ increases.

At a step S31 shown in FIG. 9, the control system determines the control gain used in the fuel cut control in accordance with the friction coefficient μ determined at the step S2 of FIG. 6. The control gain in this example is the proportional gain KP used for calculating the desired fuel cut quantity C according to the PID control law in the step S6. The proportional control gain KP is increased as the friction coefficient μ increases. The control gain in this example is a monotone increasing (or nondecreasing) function of μ, and increases with μ in the same manner as the threshold SR1 of the step S21 of FIG. 8.

At a step S32 of FIG. 9, the control system compares the sensed slip quantity S with a predetermined threshold value SR1. In the example of FIG. 9, SR1 is a predetermined constant greater than SR0. If the sensed slip quantity S is greater than SR1 (S>SR1), the control system performs the closing operation of the second throttle valve 4 at the step S4 of FIG. 6, and the fuel cut control operation at the steps S6 and S7. If S is equal to or smaller than SR1 (S≦SR1), then the control system performs the operation to maintain the fully open position of the second throttle valve 4 at the step S5, and the fuel cut control operation at the steps S6 and S7.

In this way, the control system increases the control gain KP with increase in the friction coefficient μ, and thereby increases the desired fuel cut quantity C even if the sensed slip quantity S remains unchanged. With the increased fuel cut quantity C, the control system increases the number of the cylinders to which the fuel supply is cut off, and efficiently decreases the vehicle driving force to such a level as to restrain the slipping condition. As a result, the control system can relatively decrease the likelihood of the second throttle valve closing operation of the step S4 as in the preceding example.

Figure 10:
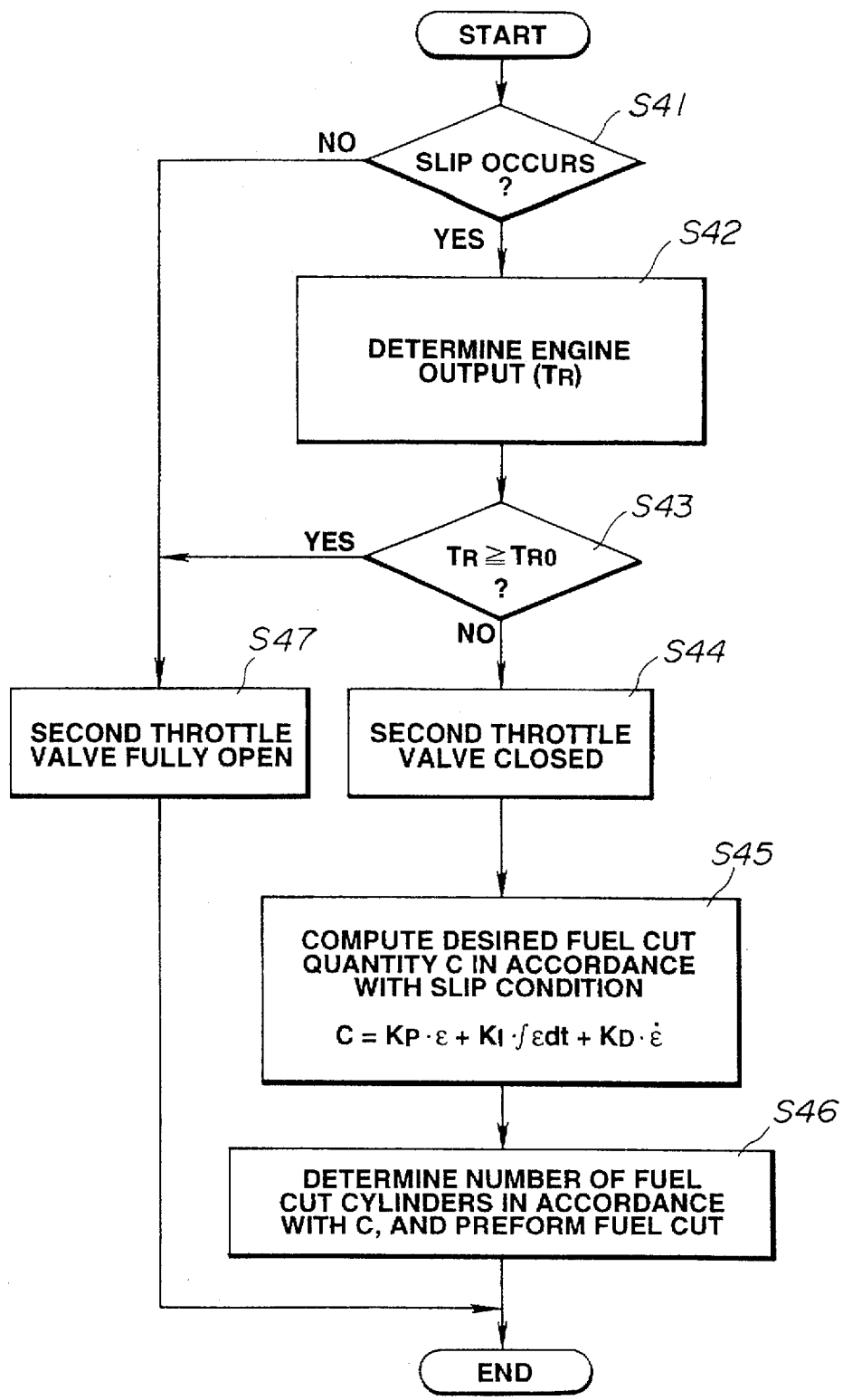
FIG. 10 is a flow chart showing a control procedure performed by a control system according to one practical example of the third embodiment of the present invention.

FIG. 10 shows a control procedure according to a third embodiment of the present invention. A control system according to the third embodiment is constructed substantially in the same manner as the control system shown in FIG. 3. In the third embodiment, however, the second driving force reducing means 103 can be omitted.

Figure 1:
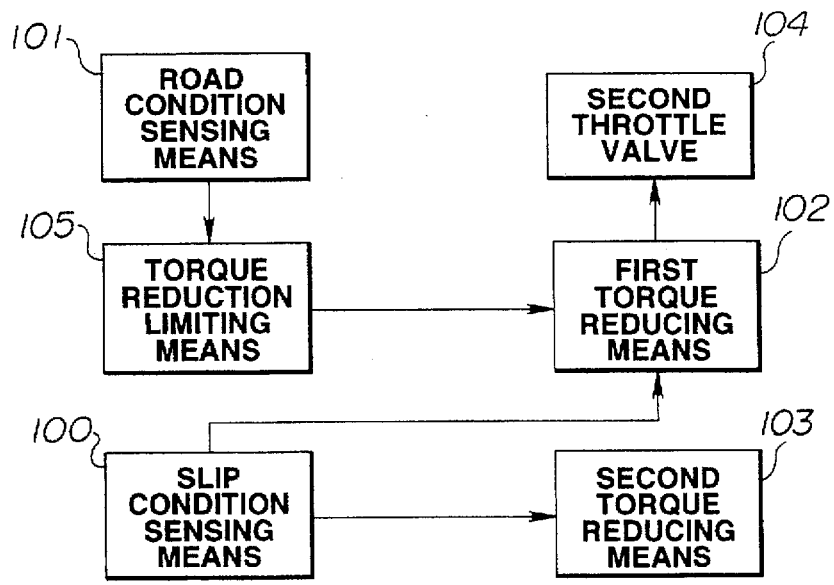
FIG. 1 is a block diagram showing, as an example, an arrangement of various means appearing in first and second embodiments of the present invention.

At a step S41 of FIG. 10, the control system checks whether a slip condition exists (as in the step S1 of FIG. 1). If no slip is detected, the control system proceeds to a step S47 and maintain the fully open state of the second throttle valve 4.

If the slip condition exists, the control system proceeds to a step S42 and determines, at the step S42, a required engine output torque TR, which, in this example, is an opening degree θ of the first throttle valve 3. The means for performing the step S42 corresponds to the required engine output torque sensing means 107.

At a step S43, the control system determines whether a driver's input command to accelerate the vehicle is greater or not, by determining whether the required engine output torque TR is equal to or greater than a predetermined value TR0.

If TR≧TR0, that is, throttle opening μ is equal to or greater than a predetermined throttle opening value θ0 (θ≧θ0), then the control system proceeds to the step S47, and maintains the fully open state of the second throttle valve 4. In this case, the control system performs neither the second throttle closing operation nor the fuel cut control operation.

When, for example, the vehicle is stuck, and the degree of the driver's intention to accelerate is high to escape from the stuck condition, this control system increases the vehicle driving force to accelerate the engine, allowing a drive wheel slippage, in compliance with the driver's accelerating intention, and provides the vehicle with an accelerating ability to escape from the stuck condition.

If TR<TR0, that is, θ<θ0 (the driver's accelerator input command is small), the control system proceeds from the step S43 to a step S44. The control system closes the second throttle valve 4 to the predetermined closed position at the step S44, and then performs the fuel cut control operations at steps S45 and S46 similar to the steps S6 and S7 shown in FIG. 6. In this case, it is optional to select the closing or opening operation of the second throttle valve 4 in accordance with the level of the slip as in the preceding embodiments.

In the example of FIG. 10, the required engine output torque TR is in the form of the throttle opening degree θ of the first throttle valve 3. It is, however, possible to employ the basic fuel injection quantity TP, an intake pressure or some other condition. For example, the basic fuel injection quantity Tp is a quantity obtained by multiplying a fraction whose numerator is the intake air flow rate Qa and whose denominator is the engine speed Ne, by a predetermined constant K as in a conventional example of the fuel injection control. In this case, Tp=K×(Qa/Ne).

Figure 11:
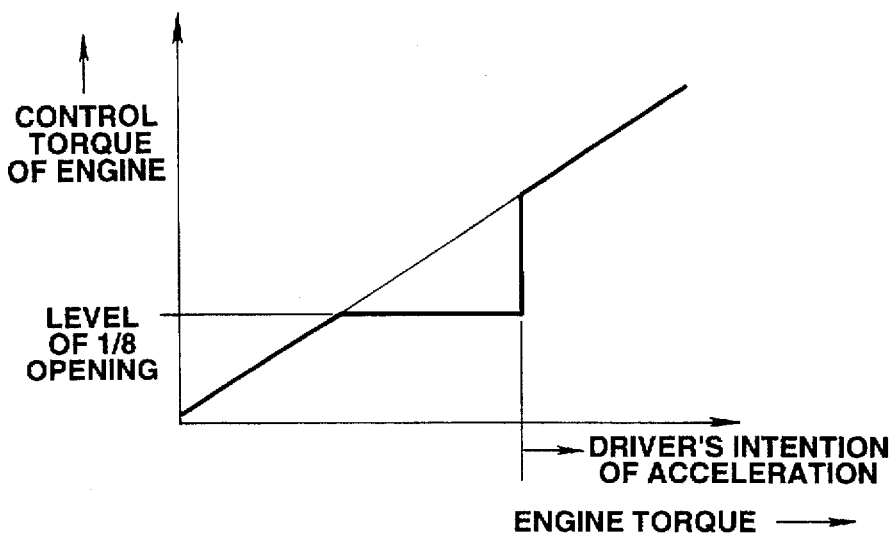
FIG. 11 is a graph showing an operation of the control system according to the third embodiment.
Figure 12:
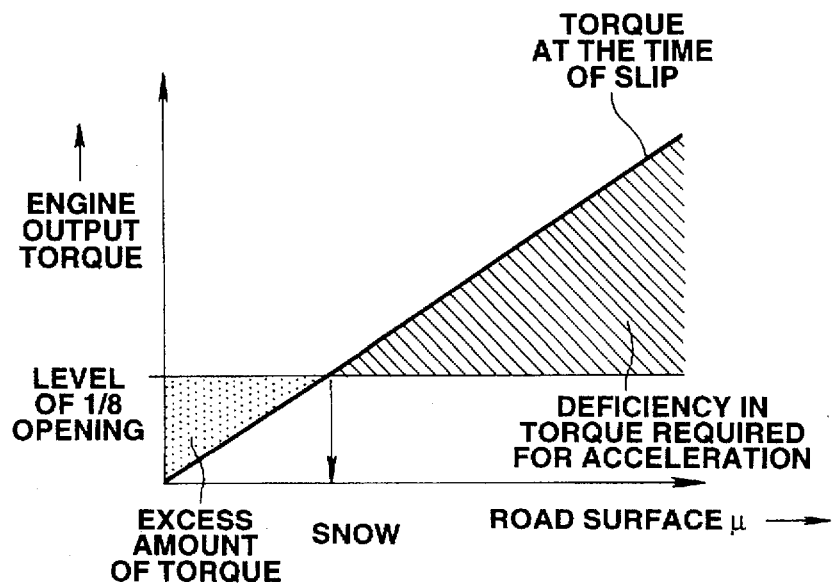
FIG. 12 is a graph showing an operation of a traction control of a simple type.

FIG. 11 shows characteristics of the control system of the example shown in FIG. 10.

According to the illustrated embodiments of the present invention, as explained above, the vehicle driving torque control system is made up of three parts which are:

an actuating means for reducing a vehicle driving torque or force in response to a control signal;

a vehicle operating condition sensing means for sensing one or more vehicle operating conditions; and a controlling means for controlling the vehicle driving torque by producing the control signal.

FIG. 13 shows, as one of various possible examples, various components which can constitute these three means.

The actuating means in the example of FIG. 13 comprises a first actuating means 511 (items 4, 15 and 21, for example) and a second actuating means 512 (item 31 and/or 8, for example).

The vehicle operating condition sensing means in the example of FIG. 13 comprises a first sensing means 521 (items 5A, 5B, 6A and 6B, for example), and a second sensing means 523 (32 and 33, or 34 for example).

The controlling means in the example shown in FIG. 13 comprises:

a first control means 531 for controlling the vehicle driving torque by operating the first actuating means 511;

a second control means 532 for controlling the vehicle driving torque by operating the second actuating means 512;

a slip detecting means (541, 542); and a torque reduction restraining means (552, 554, 555, 556).

The slip detecting means in the example of FIG. 13 comprises:

a first parameter determining means 541 for determining a first vehicle operating parameter such as a drive wheel slip quantity S from the signals from the first sensing means 521; and a slip detecting comparator means 542 for producing a torque reduction request signal when the slip quantity S is greater than a predetermined slip level (such as SR0).

The torque reduction restraining means in the example of FIG. 13 comprises either or both of:

a first set of a second parameter determining means 551 for determining a second operating parameter such as a parameter representing a road surface friction coefficient μ or a drive wheel output torque TD, and a condition discriminating means 552 in the form of a partial disabling means for disabling the first control means 531 when the second parameter (μ, TD) is greater than a predetermined value (μ0, TS); and a second set of a further (second) parameter determining means 553 for determining a further (second) operating parameter such as a variable (TR) representing an accelerator opening, or some other variable representing a driver's intention of accelerating the engine, and a condition discriminating means 554 in the form of a total disabling means for disabling both of the first and second control means 531 and 532 when the further (second) operating parameter TR is greater than a predetermined value (TR0).

The second sensing means 522 in one example may comprise the longitudinal and lateral acceleration sensors 32 and 33 as in the first example of the first embodiment shown in FIG. 6.

The second sensing means 522 in another example may comprise one or more engine operating condition sensors for determining a variable (such as TE) representing an engine output torque by sensing one or more engine operating conditions such as an engine load condition (such as Qa) and an engine speed condition (such as Ne); and a transmission sensor for determining a transmission ratio (such as NT). The second sensing means 522 may further comprise a means for determining a basic fuel injection quantity TP (in a fuel injection control system). Alternatively, the second sensing means 522 may be arranged to receive information items, such as the basic fuel injection quantity TP and the transmission ratio, from some other vehicle control system such as a fuel injection control system and/or a transmission control system, or from a sensor or sensors for the other vehicle control system.

The second sensing means 522 in still another example may comprise a first sensor means (32 and 33, for example) for sensing a road condition indicative vehicle operating condition to determined a road condition indicative vehicle operating parameter (μ or TD, for example), and a second sensor means (34, for example) for sensing a driver's accelerator input indicative vehicle operating condition (θ, for example) to determine an accelerator input indicative parameter (TR, for example); and the reduction restraining means may comprise a first restraining means (552) for limiting the torque reduction control operation of the first control means 531 when the road condition indicative operating parameter (μ, TD) is increased, and a second retraining means (554) for limiting the torque reduction control operation of the first control means 531 when the accelerator input indicative operating parameter (TR) is increased. In this case, the second vehicle operating condition comprises the road condition indicative condition and the accelerator input indicative condition, and the second vehicle operating parameter comprises the road condition indicative parameter and the accelerator input indicative parameter.

Figure 2:
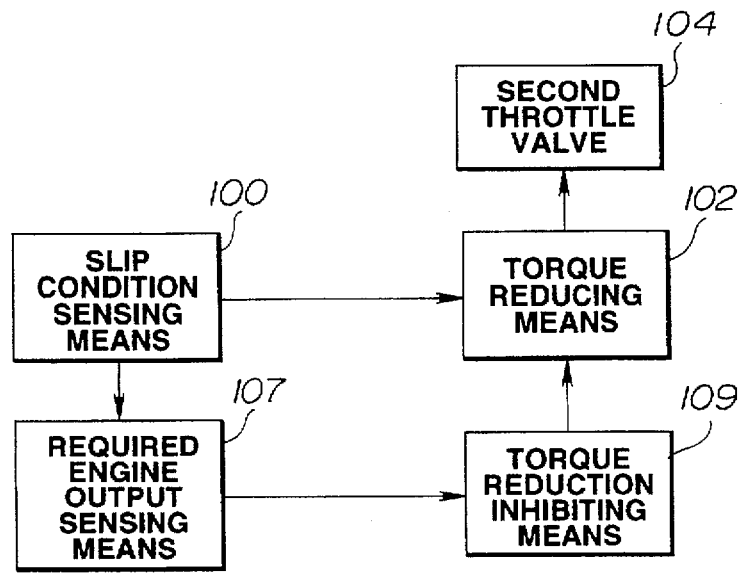
FIG. 2 is a block diagram showing, as an example, an arrangement of various means appearing in a third embodiment of the present invention.

The slip condition sensing means 100 shown in FIG. 1 or 2 can correspond to the first sensing means 521 and the first parameter determining means 541. The first torque reducing means 102 can correspond to the first control means 531 and the first actuating means 511 excluding the second throttle valve (4, 104). The second torque reducing means 103 can correspond to the second actuating means 512 and the second control means 532. The road condition sensing means 101 can correspond to the second sensing means 522 and the second parameter determining means 551. The torque reduction limiting means 105 shown in FIG. 1 can correspond to the partial disabling means 552. The torque reduction inhibiting means 109 can correspond to the total disabling means 554.

What is claimed is:

1. A driving torque control system for a vehicle, comprising:
    a second throttle valve which is disposed in series to a first throttle valve in an intake passage for an engine and which is switched between a fully open position and a predetermined closed position;
    a slip condition sensing means for sensing a drive wheel slip condition of the vehicle;
    a first torque reducing means for reducing a vehicle driving torque of the vehicle by closing said second throttle valve to the predetermined closed position in accordance with the slip condition sensed by said slip condition sensing means;
    a second torque reducing means for reducing the vehicle driving torque in accordance with the slip condition sensed by said slip condition sensing means;
    a road condition sensing means for sensing a frictional condition of a road surface under the vehicle; and
    a limiting means for limiting an operation of said first torque reducing means and allowing an operation of said torque reducing means in a road surface condition of a friction coefficient higher than a predetermined friction level,
    wherein said first torque reducing means comprises a two-step actuator for switching said second throttle valve from the fully open position to the predetermined closed position to reduce the vehicle driving torque, and
    wherein said second torque reducing means comprises means for reducing the vehicle driving torque by altering a manipulated variable which is one of a fuel cut cylinder number that is a number of engine cylinders to which fuel supply is to be cut off, a retard angle in an ignition timing of an ignition system of the engine, a braking force produced by a brake system of the vehicle and a transmission ratio of a transmission of the vehicle.

2. A control system as claimed in claim 1 wherein said actuator comprises a negative pressure working chamber for receiving a negative pressure, and a diaphragm for moving said second throttle valve between the fully open position and the predetermined closed position in dependence on whether the negative pressure is introduced to said negative pressure working chamber or not.

3. A control system as claimed in claim 1 wherein said road condition sensing means comprises an acceleration sensing means for sensing a vehicle acceleration which is at least one of a longitudinal acceleration and a lateral acceleration of the vehicle, and a friction coefficient determining means for determining a road surface friction coefficient in accordance with a magnitude of the vehicle acceleration sensed when a slip occurs.

4. A control system as claimed in claim 1 wherein said road condition sensing means comprises a driving force estimating means for estimating a driving force of drive wheels of the vehicle, and determining a road surface friction coefficient in accordance with a magnitude of the driving force estimated when a slip occurs.

5. A control system as claimed in claim 1 wherein said second torque reducing means is a means for reducing the vehicle driving torque independently of said first torque reducing means, and comprises a fuel cutting means for varying an actual fuel cut cylinder number in accordance with the slip condition, and said fuel cut cylinder number is a number of engine cylinders to which a supply of fuel is cut off.

6. A control system as claimed in claim 5 wherein said second torque reducing means comprises a fuel cut cylinder number determining means for computing a desired reduction quantity of a fuel supply quantity in accordance with a slip deviation of a slip quantity sensed by said slip condition sensing means from a desired slip quantity, for determining a desired fuel cut cylinder number in accordance with said reduction quantity and for commanding said fuel cutting means to vary the actual fuel cut cylinder number so that the actual fuel cut cylinder number becomes equal to the desired fuel cut cylinder number.

7. A control system as claimed in claim 1 wherein said limiting means comprises a threshold increasing means for limiting the operation of said first torque reducing means by increasing a slip threshold in accordance with the friction condition and preventing the operation of said first torque reducing means when the slip quantity sensed by said slip condition sensing means is greater than the slip threshold.

8. A control system as claimed in claim 7 wherein said limiting means comprises a torque reduction increasing means for limiting the operation of said first torque reducing means by increasing a torque reduction quantity of said second torque reducing means.

9. A driving torque control system for a vehicle, comprising:
    an actuating section for reducing a vehicle driving torque of the vehicle in response to a control signal, said actuating section comprising a second throttle valve disposed, in an intake passage of an engine, in series to a first throttle valve operatively connected with an accelerator of the vehicle;
    a vehicle operating condition sensing section which comprises a first operating condition sensor for sensing a first vehicle operating condition of the vehicle to determine a first vehicle operating parameter representing a drive wheel slip condition of the vehicle; and
    a controlling section for controlling the vehicle driving torque in accordance with the first vehicle operating parameter by sending the control signal to said actuating section, said controlling section being configured to reduce the vehicle driving torque by closing said second throttle valve in accordance with said first vehicle operating parameter,
    wherein said vehicle operating condition sensing section further comprises a second operating condition sensor for sensing a second vehicle operating condition to determine a second vehicle operating parameter distinct from said first vehicle operating parameter, said second vehicle operating parameter representing a road surface frictional condition, wherein said controlling section is further configured to restrain a control operation of closing said second throttle valve when said second operating parameter increases;

wherein said actuating section comprises first and second actuators for reducing the vehicle driving torque, in dependence on the first vehicle operating parameter, by altering first and second manipulated variables, respectively, said first manipulated variable representing an opening degree of said second throttle valve, said second manipulated variable representing one of a fuel cut cylinder number that is a number of engine cylinders to which fuel supply is to be cut off, a retard angle in an ignition timing of an ignition system of the engine, a braking force produced by a brake system of the vehicle and a transmission ratio of a transmission of the vehicle, wherein said first actuator for altering the first manipulated variable is a two-step actuator for normally holding said second throttle valve in a fully open position and switching said second throttle valve from said fully open position to a fully closed position of a predetermined opening degree in response to a first control signal sent from said controlling section, and wherein said controlling section is configured to reduce the vehicle driving torque only with the second actuator as a function of the first vehicle operating parameter when said second operating parameter increases.

10. A control system as claimed in claim 9:

wherein said controlling section further comprises a slip detecting section for producing a torque reduction request signal when said first vehicle operating parameter representing the drive wheel slip condition is greater than a predetermined slip level, and said controlling section includes a section for producing said first control signal to close said throttle valve in response to said torque reduction request signal.

11. A control system according to claim 9 wherein said controlling section comprises a control unit for inhibiting a closing operation of said second throttle valve by holding said two-step actuator invariably in said first stable state regardless of said torque reduction request signal as long as said second operating parameter is greater than said predetermined value.

12. A control system according to claim 9 wherein said two-step actuator has only first and second stable states and alternates between the first stable state for holding said second throttle valve in said fully open position and the second stable state for holding said second throttle valve in said fully closed position.

13. A control system according to claim 9 wherein said two-step actuator comprises a negative pressure working chamber for receiving a negative pressure, a diaphragm for moving said second throttle valve between the fully open position and the fully closed position, a negative pressure inlet port for introducing the negative pressure into the negative pressure working chamber to move said second throttle valve to the fully closed position, and an atmospheric pressure inlet port for introducing an atmospheric pressure into the negative pressure working chamber to hold said second throttle valve in the fully open position; and wherein said control unit is configured to inhibit the closing operation of said second throttle valve by holding said actuator in a state in which the negative pressure inlet port is closed and the atmospheric pressure inlet port is open.

14. A control system according to claim 9 wherein said second manipulated variable is said fuel cut cylinder number and said second actuator comprises fuel injector valves for supplying fuel to the engine.

15. A driving torque control system for a vehicle, comprising:

an actuating means for reducing a vehicle driving torque of the vehicle in response to a control signal, said actuating means comprising a second throttle valve disposed, in an intake passage of an engine, in series to a first throttle valve operatively connected with an accelerator of the vehicle, a vehicle operating condition sensing means which comprises a first sensing means for sensing a first vehicle operating condition of the vehicle to determine a first vehicle operating parameter representing a drive wheel slip condition of the vehicle; and a controlling means for controlling the vehicle driving torque in accordance with the first vehicle operating parameter by sending the control signal to said actuating means, said controlling means comprising a first control means for reducing the vehicle driving torque by closing said second throttle valve in accordance with said first vehicle operating parameter;

wherein said vehicle operating condition sensing means further comprises a second sensing means for sensing a second vehicle operating condition to determine a second vehicle operating parameter distinct from said first vehicle operating parameter, wherein said controlling means further comprises a reduction restraining means for restraining said first control means from closing said second throttle valve when said second operating parameter increases, wherein said actuating means further comprises a two-step actuator for normally holding said second throttle valve in a fully open position and switching said second throttle valve from said fully open position to a predetermined closed position in response to a first control signal sent from said controlling means;

wherein said controlling means further comprises a slip detecting means for producing a torque reduction request signal when said first vehicle operating parameter representing the drive wheel slip condition is greater than a predetermined slip level, and said first control means includes a means for producing said first control signal to close said second throttle valve in response to said torque reduction request signal, wherein said second operating parameter is a parameter representing one of a road surface frictional condition and a driver's accelerating intention, wherein said actuating means comprises a first actuating means for reducing the vehicle driving torque by altering a first manipulated variable representing an opening degree of said second throttle valve, and a second actuating means for reducing the vehicle driving torque by altering a second manipulated variable which is one of a fuel cut cylinder number that is a number of engine cylinders to which fuel supply is to be cut off, a retard angle in an ignition timing of an ignition system of the engine, a braking force produced by a brake system of the vehicle and a transmission ratio of a transmission of the vehicle, and said controlling means further comprises a second control means for reducing the vehicle driving torque by operating said second actuating means in response to said torque reduction request signal, wherein said first actuating means comprises said two-step actuator which comprises a negative pressure working chamber for receiving a negative pressure, and a diaphragm for moving said second throttle valve between the fully open position and the predetermined closed position in dependence on whether the negative pressure is introduced to said negative pressure working chamber or not, so that said first manipulated variable representing the opening degree of said second throttle valve alternates between a first value corresponding to said fully open position and a second value corresponding to said closed position, wherein said second vehicle operating condition sensed by said second sensing means to determine said second vehicle operating parameter is one of a vehicle acceleration, an engine operating condition of the engine, and an accelerator condition which is a condition of an accelerating system of the vehicle, and wherein said first sensing means comprises wheel speed sensors for sensing a drive wheel speed and a non-drive wheel speed of the vehicle to determining said first operating parameter which is a drive wheel slip quantity resulting from subtraction of said non-drive wheel speed from said drive wheel speed.

16. A control system as claimed in claim 15 wherein said reduction restraining means comprises a condition discriminating means for comparing said second operating parameter with a predetermined value, and for holding said second throttle valve in said fully open position by disabling said first control means from reducing the vehicle driving torque with said first actuating means when said second vehicle operating parameter is greater than said predetermined value.

17. A control system as claimed in claim 16 wherein said condition discriminating means comprises a partial disabling means which disables said first control means from reducing the vehicle driving torque with said first actuating means, but enables said second control means to reduce the vehicle driving force with said second actuating when said second operating parameter representing the road surface frictional condition is greater than the predetermined value.

18. A control system as claimed in claim 16 wherein said condition discriminating means comprises a total disabling means for disabling both of torque reduction control operations of said first and second control means when said second parameter representing a driver's accelerator input command is greater than the predetermined value; and said second vehicle operating condition sensed by said second sensing means to determine said second vehicle operating parameter is one of said accelerator condition which is indicative of an opening degree of said first throttle valve, and the engine operating condition which is responsive to the accelerator condition.

19. A control system as claimed in claim 15 wherein said reduction restraining means comprises an adjusting means for increasing an adjustable variable in accordance with said second operating parameter and a slip discriminating means for producing a slip discrimination signal when said first operating parameter is greater than said predetermined slip level, but smaller than a predetermined threshold level which is higher than said predetermined slip level, and preventing said first control means from closing said second throttle valve when said slip discrimination signal is present, said adjustable variable being one of said threshold level and said second manipulated quantity of said second actuating means.

20. A control system as claimed in claim 19 wherein said second control means comprises a manipulated variable determining means for reducing the vehicle driving torque by increasing said second manipulated variable of said second actuating means with increase in a deviation of said first operating parameter from a predetermined standard according to at least one of a proportional control action, an integral control action and a derivative control action, and said adjusting means comprises a control gain increasing means for increasing a control gain which is one of a proportional gain, an integral gain and a derivative gain, used by said manipulated variable determining means, in accordance with said second operating parameter.

21. A control system as claimed in claim 15 wherein said second sensing means comprises a longitudinal acceleration sensor for sensing a longitudinal acceleration of the vehicle, and a lateral acceleration sensor for sensing a lateral acceleration of the vehicle; and said controlling means comprises a second parameter determining means for determining said second operating parameter which is proportional to a square root of a sum resulting from addition of a second power of the longitudinal acceleration and a second power of the lateral acceleration.

22. A control system as claimed in claim 15 wherein said controlling means comprises a second parameter determining means for determining said second operating parameter which is proportional to a product resulting from multiplication of a first variable representing an engine output torque by a transmission ratio.

23. A control system as claimed in claim 15 wherein said second sensing means comprises a first sensor means for sensing a road condition indicative vehicle operating condition to determine a road condition indicative vehicle operating parameter and a second sensor means for sensing an accelerator input indicative vehicle operating condition to determine an accelerator input indicative parameter; and said reduction restraining means comprises a first restraining means for restraining a torque reduction control operation of said first control means when said road condition indicative operating parameter is increased, and a second retraining means for restraining the torque reduction control operation of said first control means when said accelerator input indicative operating parameter is increased.

* * * * *